(12) United States Patent
Blum

(10) Patent No.: US 6,473,001 B1
(45) Date of Patent: Oct. 29, 2002

(54) ELECTRONIC LATERAL VIEWERS FOR A VEHICLE

(76) Inventor: Alvin S. Blum, 2350 Del Mar Pl., Fort Lauderdale, FL (US) 33301

( * ) Notice: Subject to any disclaimer, the term of this patent is extended or adjusted under 35 U.S.C. 154(b) by 0 days.

(21) Appl. No.: 09/922,369

(22) Filed: Aug. 6, 2001

(51) Int. Cl.[7] ............................................... G08G 1/017
(52) U.S. Cl. ...................... 340/937; 340/903; 340/980; 340/435; 340/438; 340/459
(58) Field of Search ................................. 340/937, 438, 340/459, 461, 971, 980, 903, 435

(56) References Cited

U.S. PATENT DOCUMENTS

| | | | | |
|---|---|---|---|---|
| 4,778,212 A | * | 10/1988 | Tomforde | 296/180.1 |
| 4,910,591 A | | 3/1990 | Petrossian | |
| 4,968,124 A | * | 11/1990 | Deckert et al. | 350/574 |
| 5,027,200 A | | 6/1991 | Petrossian | |
| 5,289,321 A | * | 2/1994 | Secor | 359/896 |
| 5,756,988 A | * | 5/1998 | Furuta | 250/208.1 |
| 6,151,065 A | | 11/2000 | Steed | |
| 6,175,300 B1 | * | 1/2001 | Kendrick | 340/436 |
| 6,384,741 B1 | * | 1/2001 | O'Leary, Sr. | 340/937 |
| 6,222,447 B1 | * | 4/2001 | Schofield et al. | 340/461 |

* cited by examiner

*Primary Examiner*—Daniel J. Wu
*Assistant Examiner*—Daniel Previl
(74) *Attorney, Agent, or Firm*—Alvin S. Blum

(57) ABSTRACT

When beside an obscuring obstruction such as a truck, sport utility vehicle, building, or vegetation beside a driveway, a vehicle operator cannot see if a person or vehicle is approaching from the side into the area about to be entered. Only after moving out partially into the traffic lane will an approaching person or vehicle become visible. This can result in damage and injury. The invention provides the driver of a land vehicle with a view of the roadway ahead and to the side of the vehicle and of the roadway behind and to the side of the vehicle that may not be visible from the driver's position. An electronic viewing element, or elements, of the invention extend beyond the front and/or the rear of the vehicle and view the roadway lateral to the vehicle. Because such apparatus is very vulnerable to damage, provisions are made to retract the element to a protected position within the contour of the vehicle when not in use, and to extend the apparatus to use position as required. The viewing element, or elements, of the invention may take the form of imaging devices. Images produced by the viewing elements are transmitted to display devices that are visible to the driver from the driving position. In an alternative embodiment of the invention, the viewing element may be positioned at the forward or rear end of the vehicle contour without actually extending beyond that point. The element is less vulnerable and need not be retracted for protection.

16 Claims, 4 Drawing Sheets

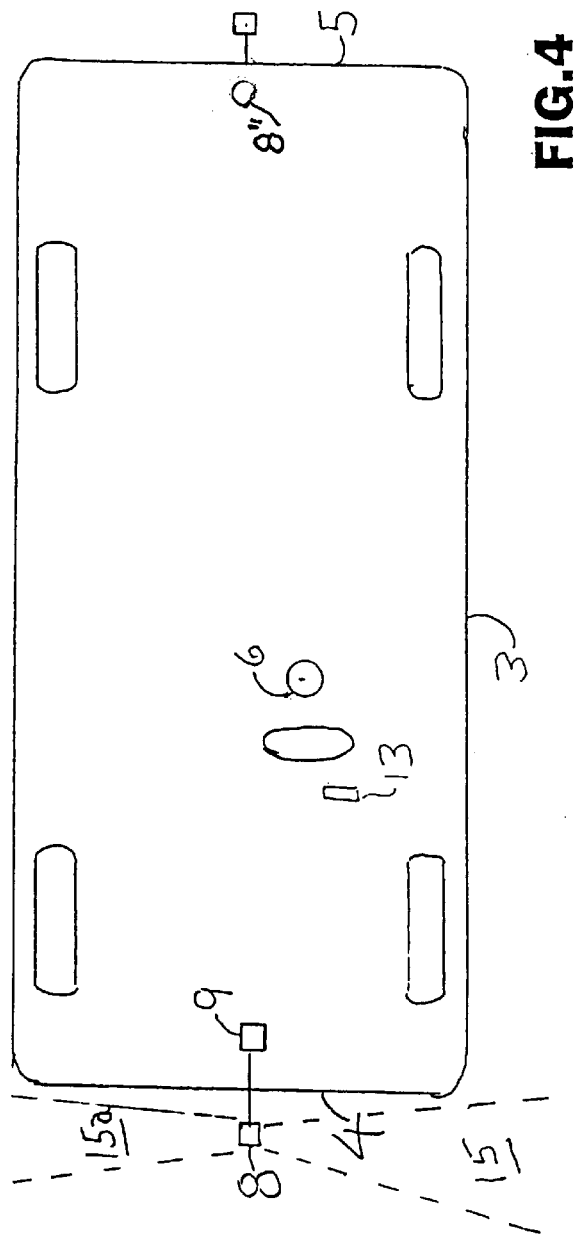
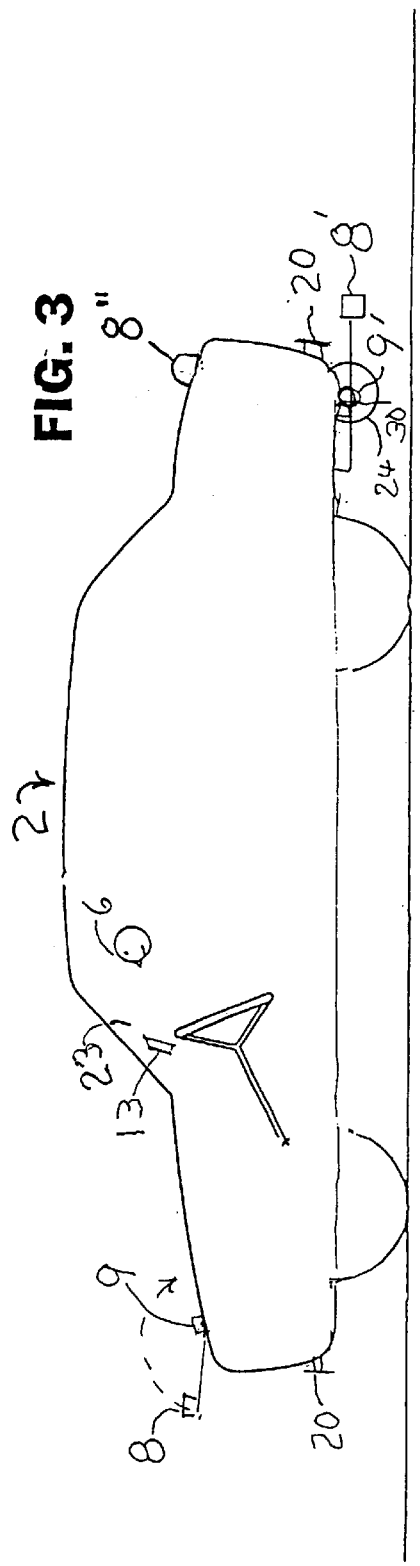

ELECTRONIC LATERAL VIEWERS FOR A VEHICLE

FIELD OF THE INVENTION

This invention relates to apparatus for safe operation of a motor vehicle and more particularly to apparatus that permits a vehicle operator to see anyone approaching that portion of the roadway that is about to be traversed by the operator's vehicle from a side of the roadway that is obscured by an obstruction adjacent the vehicle.

BACKGROUND OF THE INVENTION

The area of the roadway forward of a vehicle is generally visible through the windshield to a driver about to enter that area. The area of the roadway directly behind a vehicle is generally visible to a driver about to back into that area through rear or side view mirrors. In special situations a series of mirrors are employed to see this area. However, when beside an obscuring obstruction such as a truck, sport utility vehicle, building, or vegetation beside a driveway, a vehicle operator cannot see if a person or vehicle is approaching from the side into the area forward or behind the driver that is about to be entered. Only after moving out from the space and partially into the traffic lane will an approaching person or vehicle become visible. This can result in damage and injury. The prior art has addressed the problem of viewing the obscured area directly behind the vehicle as it backs up, but not of viewing the areas to the side of and behind or ahead of the vehicle.

SUMMARY OF THE INVENTION

It is accordingly an object of the invention to provide the driver of a vehicle with a view of the roadway ahead and to the side of the vehicle and of the roadway behind and to the side of the vehicle that may not be visible from the driver's position. A viewing element, or elements, of the invention at the front and/or the rear of the vehicle view the roadway lateral to the vehicle. Because such apparatus may be vulnerable to damage, provisions may be made to retract the element to a protected position within the contour of the vehicle when not in use, and to extend the apparatus to a use position that may be beyond the vehicle contour as required. The viewing elements may take the form of video imaging devices such as charge coupled diode arrays that provide an electrical video signal to a video display visible to the driver, video cameras that transmit a wireless signal to a video receiver visible to the driver, and the like. The viewing element or elements may be mounted adjacent to the forward or rear end of the vehicle contour, as desired. A single viewing element may view both sides of the roadway such as by a prism or mirror. These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 3 is a diagrammatic side elevation view of vehicle 2 of FIG. 2 equipped with various embodiments of the invention.

FIG. 4 is a diagrammatic top view of the vehicle of FIG. 3.

DETAILED DESCRIPTION OF PREFERRED EMBODIMENTS

Figure 1:
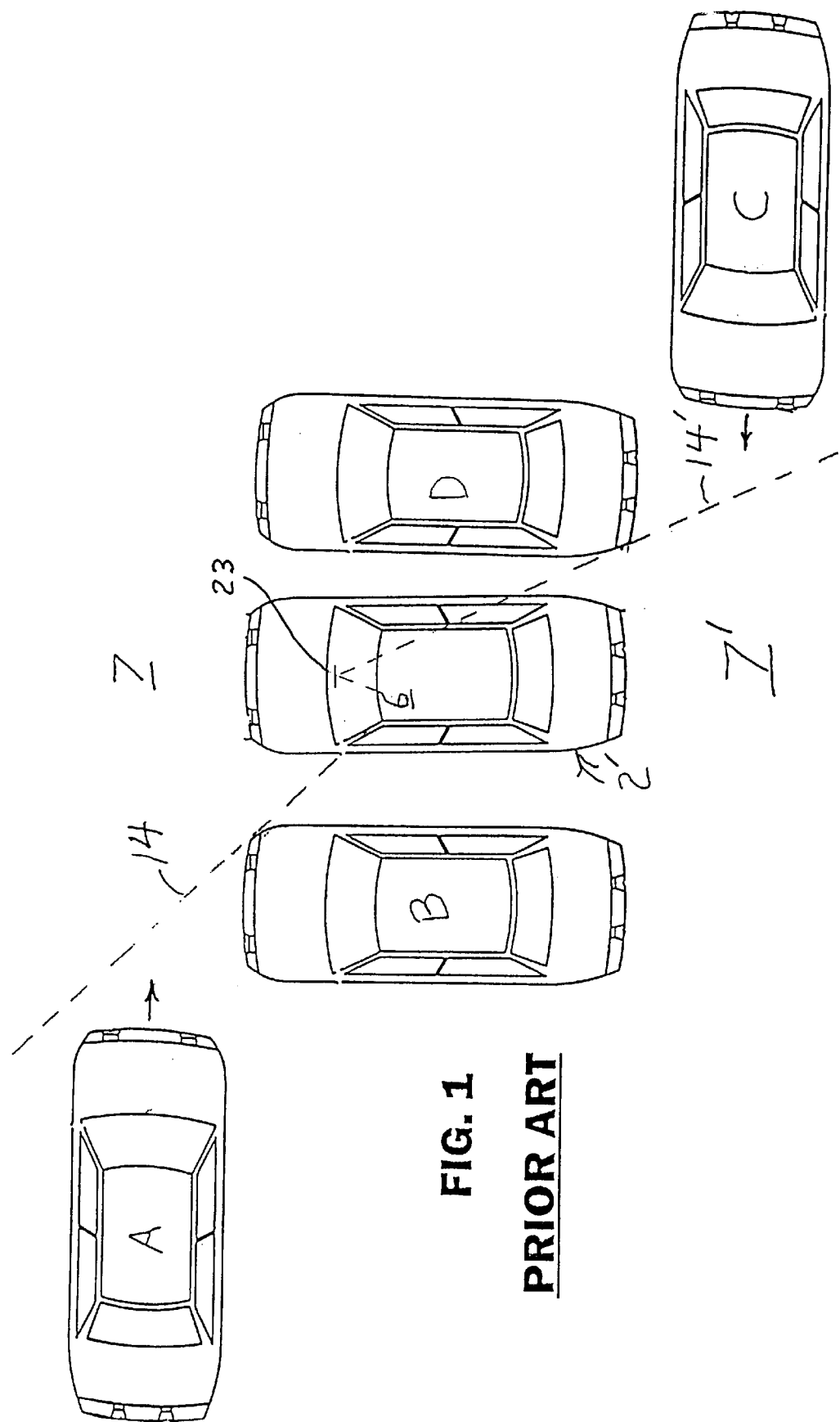
FIG. 1 is a prior art top view of vehicles in a parking lot.
Figure 2:
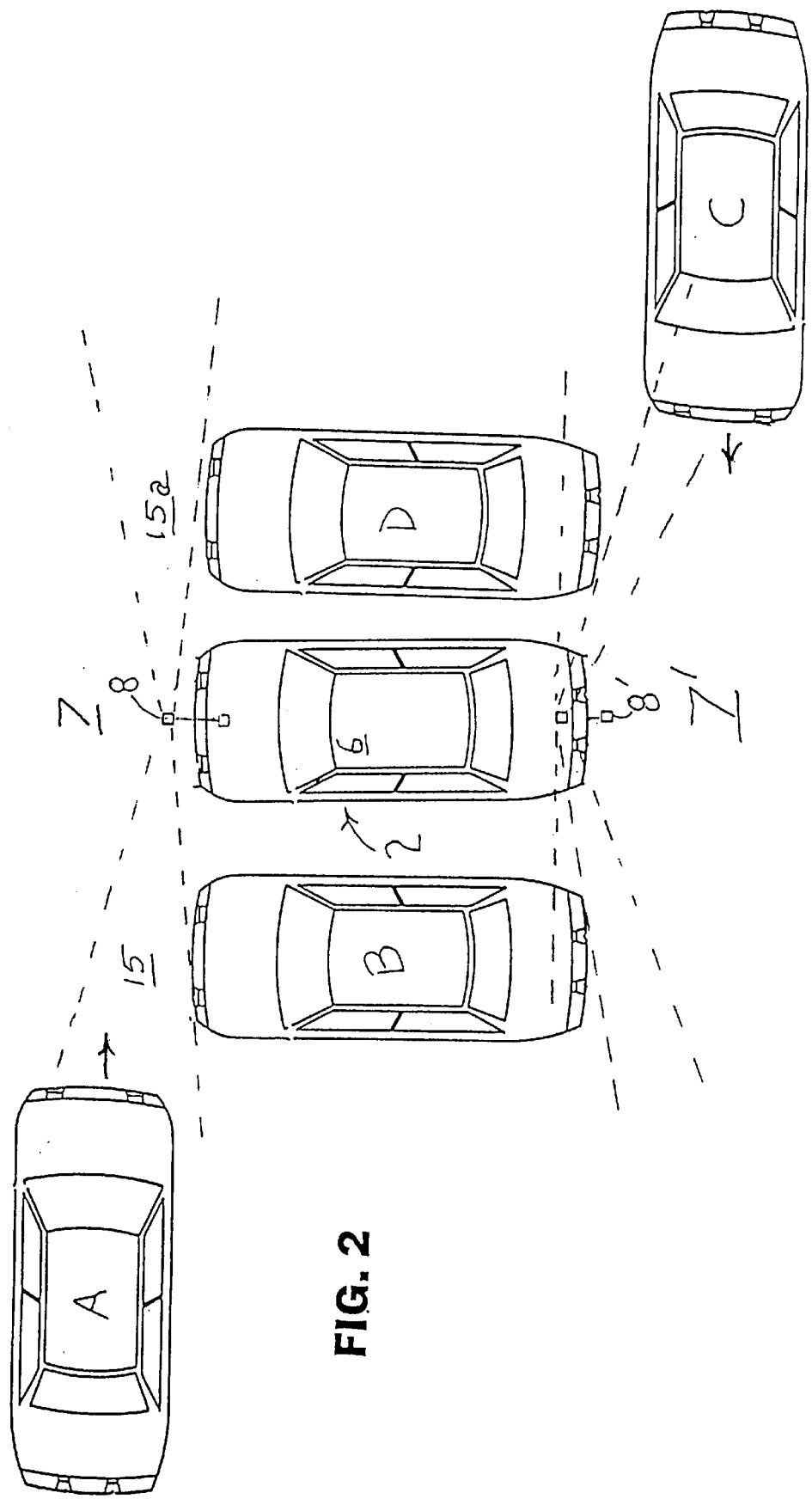
FIG. 2 is a view as in FIG. 1 with various embodiments of the invention in use.

Referring now to the prior art drawing FIG. 1, a driver in vehicle 2' of the prior art in a parking lot, intends to move forward into the portion 7 of the roadway. The driver may not be able to see, from the driver's position 6, a vehicle A about to enter portion 7, because the view of approaching vehicle A along sight line 14 is blocked by vehicle B. This problem is especially common when vehicle B is a sports utility vehicle or van and vehicle 2' is an ordinary sedan. The driver may move slowly several feet into portion 7 until the potential vehicle A is visible from position 6, while praying that any vehicle A will be moving slowly enough to stop, or is far enough from the edge of the lane to avoid hitting the front of the vehicle. Since the duration of exposure increases the probability of collision, the driver may instead move more rapidly to that position. Either choice carries risk, especially if vehicle A is being driven fast. When vehicle 2' is backing out to portion 7' of the roadway, and a vehicle C is approaching, but is not visible through rearview mirror 23 along sight line 14' because of vehicle D, similar problems are encountered. When exiting driveways, or entering intersections, for example, a driver's view may be similarly obstructed by buildings, plants, and the like.

Referring now to the drawing FIGS. 2–6, apparatus of the invention enables a driver to visualize the approaches to portions 7 and 7' from the driver's position 6 without exposing the vehicle to a potential collision.

As best seen in FIGS. 3 and 4, a line 3 represents the vehicle contour or outer extent of any portion of the vehicle. The bumpers 20 ordinarily protect portions of the front and rear of the vehicle.

The apparatus of the invention overcomes the problem of obscured visibility by providing an electronic viewing element 8 that extends beyond the forward contour end 4 of the vehicle contour 3. It has a wide enough field of view 15 to visualize any oncoming vehicle, person, or thing that is approaching from the side. By display means 13, the image viewed by viewing element 8 is made visible to the driver from the position 6.

The viewing element may also view whatever is approaching from the opposite side 15a. A similar viewing element 8' extended and retracted by means 9' may be employed to provide views beyond the rear contour end 5 to visualize approaching vehicle C for backing the vehicle safely into the roadway portion 7'. Mounting means 9' is attached underneath the vehicle body where it is hidden from view. It includes a rack and pinion translating extending and retracting mechanism 30. Guards 24 on either side of 9' protect it when retracted.

The viewing elements 8, 8' need not extend very far beyond the contour to achieve this purpose, because the vehicle can be slowly advanced until the viewing element is just enough past the obstruction that the traffic lane is visible. At worst, only the viewing element 8 is vulnerable to collision. The viewing element may be extended as needed in a first position of operation and then retracted to a safe second position within the contour 3 by extending/retracting mounting means 9,9' that is remotely operated by the driver from the driver position 6. Means 9,9' may be any well known remotely operable extending retracting means well known in the art such as, for example, a rotary actuator, a rack and pinion motor drive, a hydraulic piston drive, and the like.

Figure 9:
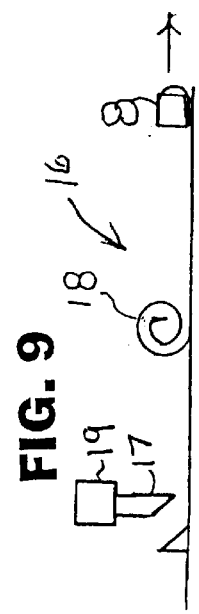
FIG. 9 is a diagrammatic side view of another embodiment of the invention.

Alternatively, as shown in FIG. 9, the means 16 may of the type that is manually extended such as by pulling out from the retracted position. This action may wind a spring motor 18 or torsion spring, and engage a latch 17 to maintain the extended position while the driver returns to the driver's position. A clockwork mechanism 19 also actuated by the manual extension will release the latch and permit the return to the retracted position after a preset time when the vehicle is safely on the roadway.

Figure 6:
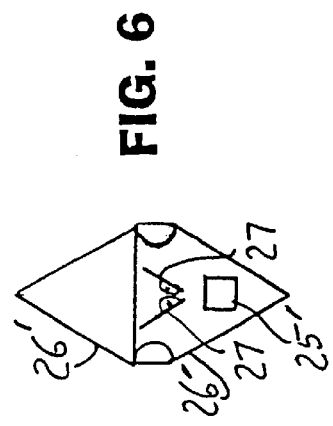
FIG. 6 is a top view of another embodiment of the invention.
Figure 5:
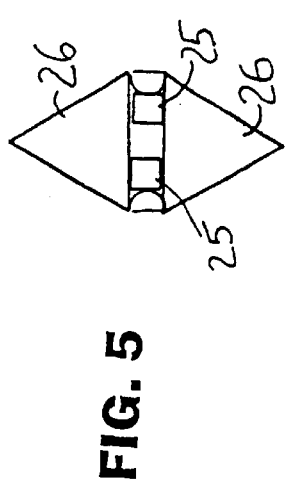
FIG. 5 is a top view of a viewing element of the invention.

A less elegant viewing element mounting means may position the viewing element at or adjacent the forward or rear contour without means for extending it beyond that contour, as exemplified by element 8" of FIGS. 3–5. The element 8" may be incorporated into an ornamental housing that protects it from damage. It may be incorporated securely into the structure of the vehicle to discourage theft. An oncoming vehicle may be easily viewed by simply moving into the portion 7 or 7' just enough to permit the element 8" to see if the path is clear. If the element 8" is mounted within one foot of the forward or rear end of the contour, then moving the vehicle only slightly into the cross traffic path will enable the driver to see oncoming traffic with very little danger. The viewing element 8" may comprise two video cameras 25 with lenses to view both sides of the roadway within a protective, aerodynamic housing 26. Referring now to FIG. 6, a single camera 25' within protective housing 26' may be used to view both sides of the roadway simultaneously by means of adjustable mirrors 27. They may be remotely adjustable, if desired.

The apparatus may be mounted in a variety of positions, as desired. It may be mounted on the hood, on the trunk, or beneath the vehicle by mounting means. It may be built into the vehicle, or retrofitted, as desired. The viewing element and display means may employ a variety of means well known in the art for enabling the driver to see what the viewing element sees. The viewing element may be a video camera that transmits the video image by cable to a video display in a closed circuit imaging arrangement. The image transmission may be wireless or wired.

Figure 8:
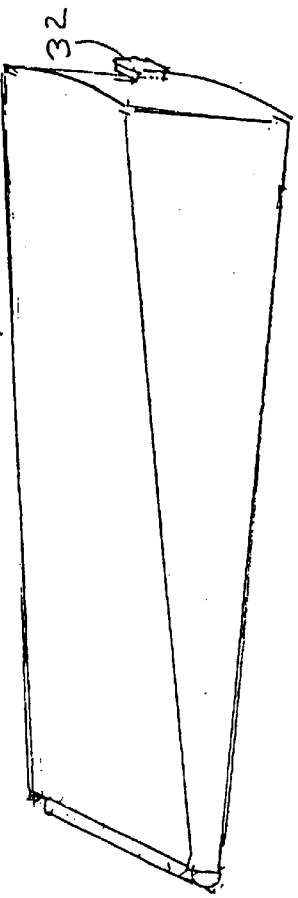
FIG. 8 is a perspective view of the embodiment of FIG. 7 in closed position.
Figure 7:
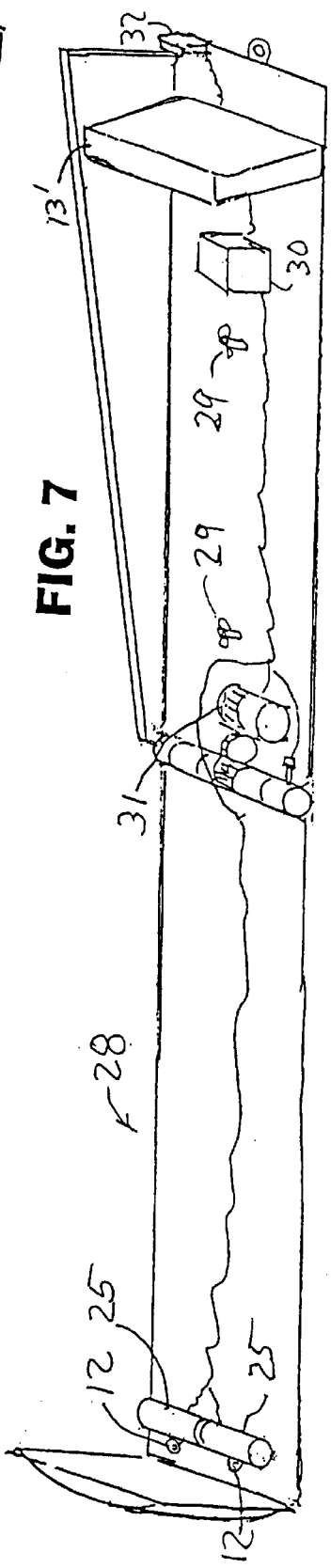
FIG. 7 is a perspective view of another embodiment of the invention.

Referring now to FIGS. 7 and 8, a self-contained embodiment of the invention 28 is shown that may be readily retrofitted to a vehicle. The apparatus may be removably mounted on a base that is attached to the vehicle to avoid theft or damage when not in use by thumb screws 29, requiring only two threaded holes in the hood of the vehicle. Position adjustment means 12 may be provided to correctly adjust the cameras 25 for optimal viewing. This adjustment may be retained when the device is removed from its base, so that it need not be readjusted each time it is mounted. An image display means 13' may be so positioned that it is visible to the driver through the windshield. The device 28 may be powered by a rechargeable battery 30. Reversible gear motor 31 opens and closes the device 28 so that in the open position, the cameras 25 may extend beyond the forward end of the vehicle contour, if desired. Infrared sensor 32 is actuated by a hand-held remote control (not shown) through the windshield to open and close and perform other operations, such as adjusting the camera angles with means 12, as desired. Alternatively, the device may be opened manually while cocking a spring motor that closes the cover after a preset time.

The images seen by the viewing elements may be made visible to the driver at the driver position 6 by a variety of image display means 13. This may be a CRT video monitor, a flat panel LCD display, or other means well known in the art.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. For a land motor vehicle having a vehicle contour with a forward contour end and a rear contour end and a driver seated at a driving position, apparatus that permits the driver, while at the driving position, to see persons or things that are approaching from the side into that portion of the roadway that is about to be traversed by the vehicle, the apparatus comprising:

a) at least one electronic viewing element;
   b) mounting means connected to the at least one viewing element adapted for mounting on the vehicle by so as to extend the viewing element beyond at least one contour end of the vehicle contour in an operative extended first mode positioned so as to view the roadway to at least one side of the viewing element to visualize what is approaching from the at least one side toward the area of the roadway that the driver is about to enter; and to retract the viewing element to within the vehicle contour in a protected, second mode; and
   c) image display means for displaying images produced by the at least one viewing element so as to be visible to the driver from the driving position.

2. The apparatus according to claim 1 in which the mounting means automatically moves the viewing means to the second mode after a preset time in the first mode.

3. The apparatus according to claim 2 in which the at least one viewing element is extended to the first mode manually.

4. The apparatus according to claim 3 in which manual extension to the first mode creates a spring bias for retracting to the second mode after the preset time.

5. The apparatus according to claim 1 in which the at least one contour end is the forward contour end.

6. The apparatus according to claim 1 in which the at least one viewing element comprises a video camera transmitting a wireless video signal and the image display means comprises a video receiver.

7. The apparatus according to claim 1 in which the at least one viewing element is a video imager transmitting a video signal by wire to the image display means.

8. The apparatus according to claim 1 in which the at least one viewing element and image display means are contained within an assembly that is mounted outside the vehicle and that is operable and viewed from within the vehicle.

9. The apparatus according to claim 1 in which the at least one contour end is the forward contour end.

10. For a land motor vehicle having a vehicle contour with a forward contour end and a driver seated at a driving position, apparatus that permits the driver, while at the driving position, to see persons or things that are approaching from the side into that portion of the roadway forward of the driver that is about to be traversed by the vehicle, the apparatus comprising:

a) at least one electronic viewing element;
b) mounting means connected to the at least one viewing element adapted for mounting on the vehicle by so as to extend the viewing element beyond the forward contour end of the vehicle contour in an operative extended first mode positioned so as to view the roadway to at least one side of the viewing element to visualize what is approaching from the at least one side toward the area of the roadway that the driver is about to enter; and to retract the viewing element to within the vehicle contour in a protected, second mode; and
c) image display means for displaying images produced by the at least one viewing element so as to be visible to the driver from the driving position.

11. The apparatus according to claim 10 in which the mounting means automatically moves the viewing means to the second mode after a preset time in the first mode.

12. The apparatus according to claim 10 in which the at least one viewing element is extended to the first mode manually.

13. The apparatus according to claim 10 in which the mounting means may be actuated from the driver's position.

14. The apparatus according to claim 10 in which the at least one viewing element comprises a video camera transmitting a wireless video signal and the image display means comprises a video receiver.

15. The apparatus according to claim 10 in which the at least one viewing element is a video imager transmitting a video signal by wire to the image display means.

16. The apparatus according to claim 10 in which the at least one viewing element and image display means are contained within an assembly that is mounted outside the vehicle and that is operable and viewed from within the vehicle.

* * * * *

UNITED STATES PATENT AND TRADEMARK OFFICE
CERTIFICATE OF CORRECTION

PATENT NO. : 6,473,001 B1  
APPLICATION NO. : 09/922369  
DATED : October 29, 2002  
INVENTOR(S) : Alvin S. Blum It is certified that error appears in the above-identified patent and that said Letters Patent is hereby corrected as shown below:

Column 4, lines 26 and 27 (Claim 1 lines 10 and 11) should read— element adapted for mounting on the vehicle for extending the viewing element beyond at least one Column 4, line 33 (Claim 1, line 17) should read— to enter, and for retracting the viewing element to within the Column 4, line 60 (Claim 9, line 2) should read— one contour end is the rear contour and Column 5, lines 3 and 4 (Claim 10, lines 10 and 11) should read— element adapted for mounting on the vehicle for extending the viewing element beyond the forward Column 5, line 9 (Claim 10, line 17) should read— to enter, and for retracting the viewing element to within the Signed and Sealed this  
Sixth Day of December, 2011

David J. Kappos  
*Director of the United States Patent and Trademark Office*